Figure 1:
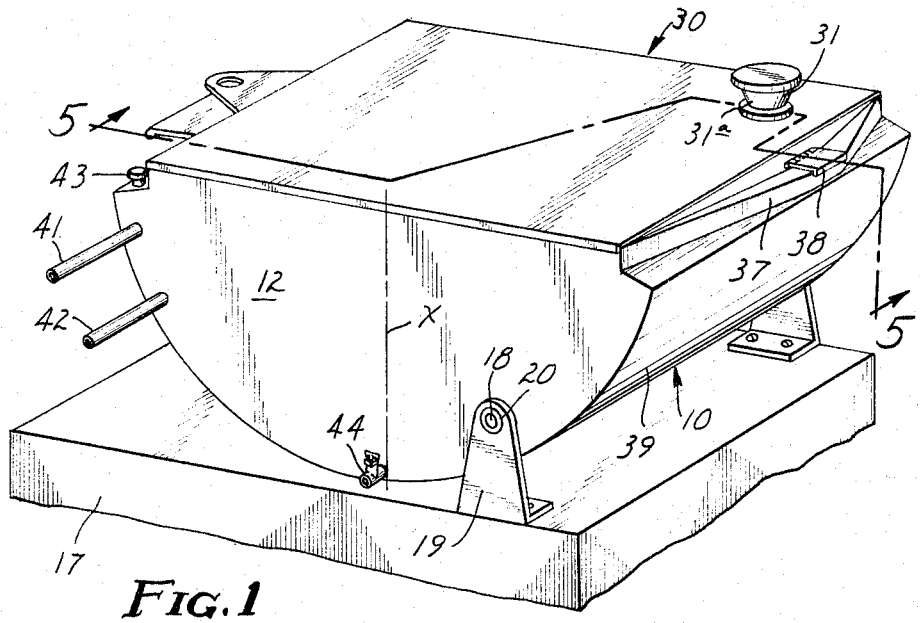

Dec. 20, 1966　　　C. J. HALLQUIST　　　3,292,519
PHOTOGRAPHIC PRINT PROCESSOR

Filed July 20, 1964　　　　　　　　2 Sheets-Sheet 1

INVENTOR
CLETUS J. HALLQUIST
BY Merchant, Merchant & Gould
ATTORNEYS

Dec. 20, 1966  C. J. HALLQUIST  3,292,519

PHOTOGRAPHIC PRINT PROCESSOR

Filed July 20, 1964  2 Sheets-Sheet 2

INVENTOR
CLETUS J. HALLQUIST
BY Merchant, Merchant + Gould
ATTORNEYS

United States Patent Office 3,292,519
Patented Dec. 20, 1966

3,292,519
PHOTOGRAPHIC PRINT PROCESSOR
Cletus J. Hallquist, R.R. 3, Red Wing, Minn. 55066
Filed July 20, 1964, Ser. No. 383,855
8 Claims. (Cl. 95—99)

My invention relates generally to photographic print or film processing or developing devices, and more particularly to light-weight, inexpensive devices for the simultaneous development of a plurality of films or prints.

A primary object of my invention is the provision of a device of the class described which is particularly adapted for rapid and efficient development of both black and white and colored films or prints by relatively small operators.

A further object of my invention is the provision of a device of the class above described which maintains the developing solution at a proper temperature and admixture, and which applies said solution uniformly to all film sheets therein, whereby to produce developed films of a uniformly superior quality, heretofore unachievable in small scale operations.

A further object of my invention is the provision of a device of the class described which is power-operated and which is consequently completely automatic.

A further object of my invention is the provision of a device of the class above described which is relatively inexpensive to produce, is foolproof in its operation, and is rugged and durable in use.

The above and still further objects of my invention will become apparent from the following detailed specification, appended claims, and attached drawings.

Figure 2:
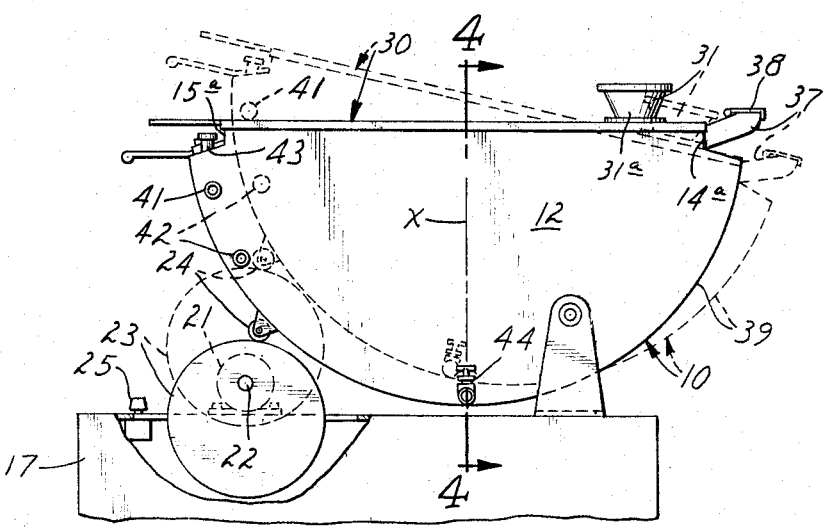
Figure 7:
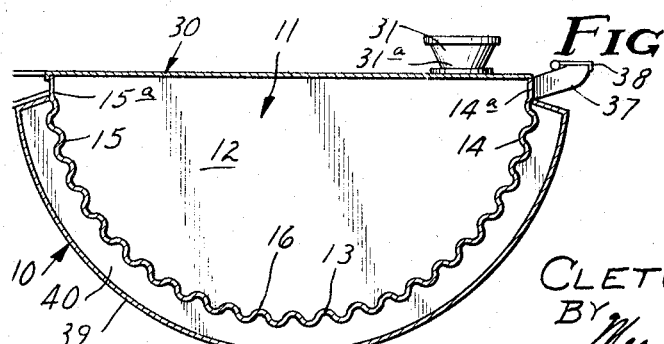
Figure 5:
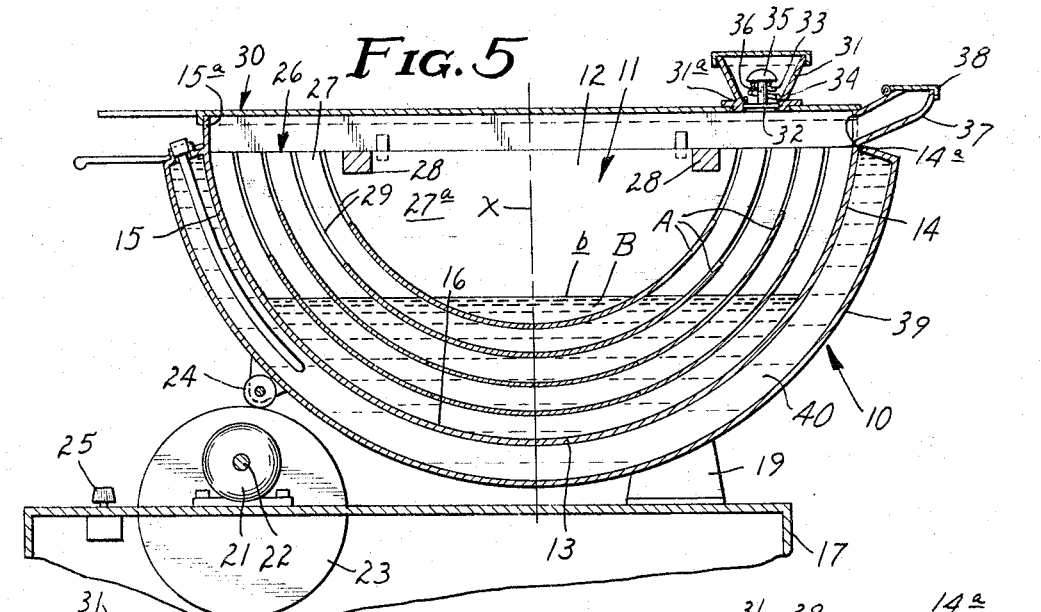
Figures 3, 4:
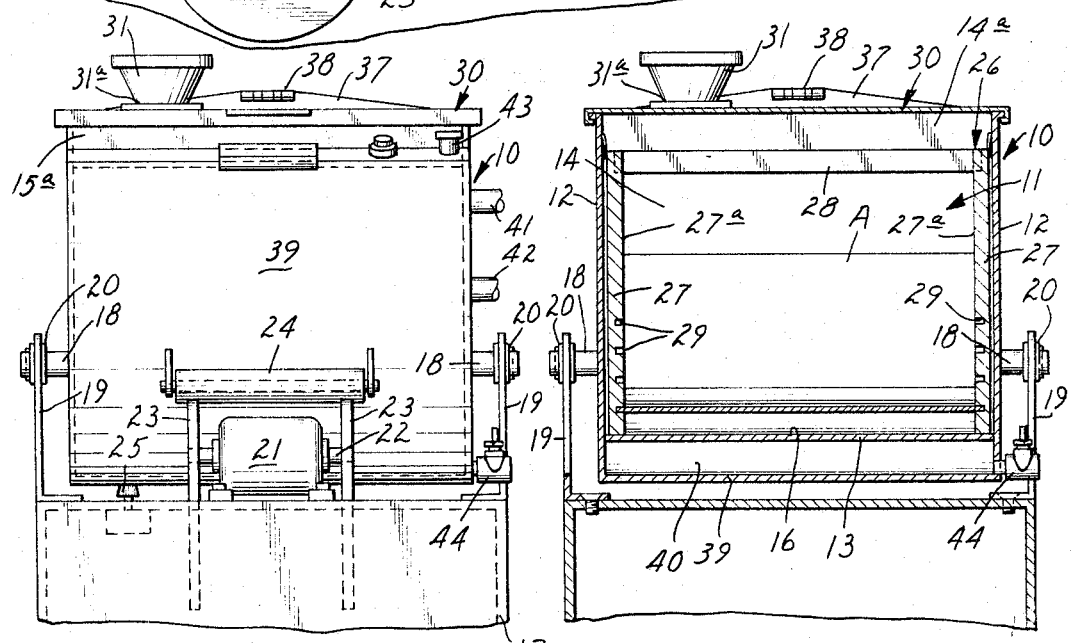
Figure 6:
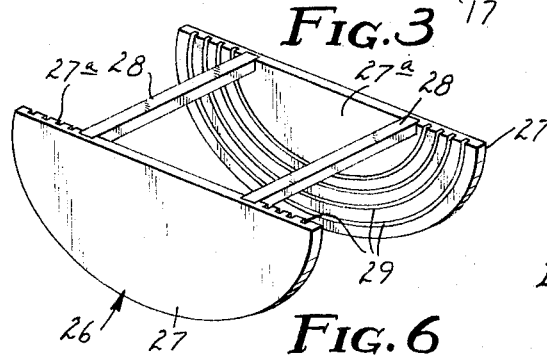

Referring to the drawings wherein like characters indicate like parts throughout the several views:

FIG. 1 is a view in perspective of my novel device;
FIG. 2 is a view in side elevation;
FIG. 3 is a view in elevation as seen from left to right of FIG. 2;
FIG. 4 is a view in vertical section as seen from the line 4—4 of FIG. 2;
FIG. 5 is a view in vertical section as seen from the irregular line 5—5 of FIG. 1;
FIG. 6 is a view in perspective of a film rack used with the structure of FIG. 1; and
FIG. 7 is a view in vertical section showing a slightly modified form of the housing bottom wall.

Referring with greater particularity to the drawings, the numeral 10 indicates in its entirety a housing which defines an upwardly opening chamber 11 having generally upright end walls 12 and a bottom wall 13 which cooperate with opposite side walls 14, 15 to define a continuous arcuate surface 16 extending at a constant radius between said end walls 12.

As shown, the housing 10 is secured to a suitable base 17 for pivotal rocking movements about a horizontal axis by means of opposed trunnions 18 having their inner ends fast on the end walls 12 and having their outer ends journalled in upstanding bearing brackets 19, as indicated at 20. As shown, the pivotal connections 20 are laterally offset from a center line X bisecting the end walls 12.

Also secured to the base 17 is an electric motor 21, the drive shaft 22 of which has mounted thereon on opposite sides thereof a pair of laterally spaced cam elements 23 which operatively engage the housing 10 in laterally offset relationship, in the opposite direction from the pivotal connection 20 from the center line X, through the medium of a roller element 24 suitably secured to and carried by said housing 10. For the purpose of varying the oscillatory rocking movements imparted to the housing 10 about the pivot axis 20, for a purpose hereinafter to be explained in detail, I provide a suitable rheostat 25 for controlling the speed of the motor 21.

Receivable within the chamber 11 through the open top thereof is a film rack identified in its entirety by 26 and comprising a pair of laterally spaced generally semi-circular plates 27, one each adjacent an end wall 12, and connected together by means of suitable handle-forming struts 28. As shown, the opposed surfaces 27a of the plates 27 are provided with concentric arcuate grooves 29, which are likewise concentric with arcuate surface 16 when received within said chamber 11.

Closing the open upper end of housing 10 is a cover element 30 which excludes light from the chamber 11. As shown, the cover element 30 is formed as at 31 to define a funnel-like member through which film-developing chemicals and fluid may be inserted into the chamber 11. The restricted lower end of 31a of the funnel-like member 31 is provided with a valve or closure plate 32 which serves as a light block and which closes automatically under the bias of the coil compression spring 33 interposed between an annular lip 34 carried by the funnel-like member 31 immediately above the restricted opening 31a, and an enlarged head 35 fast on a valve stem 36.

It will be noted that the housing 10, on the side thereof opposite the point of engagement of the cams 23 therewith, is formed to define a pouring spout 37 which is provided with a cap 38 which closes under the action of gravity.

For the purpose of maintaining the processing fluid at a desired temperature within the chamber 11, I provide an arcuate jacket 39, which as shown particularly in FIG. 5, is concentric with and covers the bottom wall 13 and side walls 14, 15. Water or other heating fluid may be circulated within the heating chamber 40 defined by the jacket 39 and the walls 13, 14, 15 through the medium of inlet and outlet conduits 41, 42, respectively, communicating therewith, as shown particularly in FIG. 1. For the purpose of permitting escape of air from the heating chamber 40, as the fluid level therein is raised, air pressure release valve 43 is provided. A drain cock 44, communicating with the heating chamber 40 at its lower end, is provided for drainage thereof.

When it is desired to develop a plurality of film sheets A, same are inserted into the bracket element 26 with the opposite edges of each thereof received in an opposed groove 29. This step must obviously take place in a darkroom. Thereafter, the rack is placed within the chamber 11 and the cover element 30 placed thereover. Suitable processing chemicals and fluid B are inserted through the funnel-like member 31, preferably to a level above the lowermost part of the uppermost groove 29 and film A therein, as indicated by b in FIG. 5. Finally, the electric motor 21 is energized so as to rotate the cam elements 23 and thereby impart rocking movements to the housing 10 about the axis of the trunnions 18. This action imparts an oscillatory flow to the fluid B within the chamber 11. For the most efficient washing action of the developing fluid B upon the several film sheets A, this oscillatory rocking action should be adjusted or timed so that the fluid B does not flow beyond the extreme upper edges 14a, 15a of the side walls 14, 15, and without causing any undue surface agitation to said fluid. Adjustment of the speed of the motor 21 through the rheostat 25 is designed to accomplish this end.

Preferably and as shown in FIG. 7, the continuous arcuate surface 16 is corrugated or otherwise roughened to impart agitation to the fluid B as well as to any residual chemicals therein, not shown, whereby to maintain the fluid B in its most efficient state during the developing process.

It should be noted that under the conditions above described, the several film sheets A will be gently but completely submerged from end to end during each complete oscillation, thereby insuring a quick, efficient, and uniform development.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:

1. A photographic film-developing device comprising:
    (a) an open-top chamber for reception of a predetermined amount of developing fluid,
    (b) said chamber having generally upright end walls, a bottom wall, and opposed side walls,
    (c) means mounting said housing for pivotal rocking movements about a horizontal axis offset in the direction of one of said side walls from a vertical line bisecting said end walls,
    (d) power-operated means engageable with said housing in offset relation toward the other of said side walls from said vertical line, whereby to impart an oscillatory flow to the fluid within said chamber,
    (e) cover means for said open-top chamber and positively excluding light therefrom,
    (f) means within said chamber and associated with said end walls defining a plurality of opposed concentrically arranged arcuate film-receiving grooves, the axes of which are intermediate said pivot axis and the point of engagement of said power means with said housing and parallel to the former.

2. The structure defined in claim 1 in which said side and bottom walls cooperate to define a continuous arcuate surface which is concentric with said grooves.

3. The structure defined in claim 1 in further combination with means for varying the timing of the rocking movements imparted to said housing by said power-operated means whereby to vary the extent of said oscillatory flow.

4. The structure defined in claim 2 in further combination with
    (a) developing fluid within said chamber having a level above the lowermost portion of the uppermost of said grooves, and
    (b) means for varying the timing of the rocking movements imparted to said housing by said power-operated means whereby to vary the extent of said oscillatory flow.

5. The structure defined in claim 1 in further combination with a removable film rack receivable in said chamber through said open-top and comprising a pair of spaced parallel interconnected end plates, said grooves being formed in opposed surfaces of said end plates.

6. The structure defined in claim 5 in which said bottom wall is roughened whereby to impart agitation to the developing fluid within the chamber during oscillations of said chamber.

7. The structure defined in claim 6 in which the said housing and said cover means cooperate to define a pouring spout on the side of said housing opposite the point of engagement thereof with said power-operated means.

8. A photographic film-developing device comprising:
    (a) an open-top chamber for reception of a predetermined amount of developing fluid,
    (b) said chamber having generally upright end walls, a bottom wall, and opposed side walls,
    (c) means mounting said housing for pivotal rocking movements about a horizontal axis,
    (d) power-operated means associated with said housing in offset relation from said pivot means whereby to impart an oscillatory flow to the fluid within said chamber;
    (e) cover means for said open-top chamber and positively excluding light therefrom,
    (f) means within said chamber and associated with said end walls defining a plurality of opposed concentrically arranged arcuate film-receiving grooves, the axes of which are intermediate said pivot axis and the point of engagement of said power means with said housing and parallel to the former, and
    (g) means for varying the timing of the rocking movements imparted to said housing by said power-operated means whereby to vary the extent of said oscillatory flow.

References Cited by the Examiner

UNITED STATES PATENTS

| | | | |
|---|---|---|---|
| 890,379 | 6/1908 | Sherrick | 95—99 |
| 2,190,754 | 2/1940 | Carleton | 95—90 |
| 2,218,727 | 10/1940 | Smith | 95—90 |
| 2,494,866 | 1/1950 | Fressola | 95—99 |

NORTON ANSHER, *Primary Examiner.*